United States Patent
Heazle

(10) Patent No.: US 7,824,606 B2
(45) Date of Patent: Nov. 2, 2010

(54) NICKEL-BASED ALLOYS AND ARTICLES MADE THEREFROM

(75) Inventor: Mark Heazle, Waterford (IE)

(73) Assignee: Honeywell International Inc., Morristown, NJ (US)

( * ) Notice: Subject to any disclaimer, the term of this patent is extended or adjusted under 35 U.S.C. 154(b) by 17 days.

(21) Appl. No.: 11/533,934

(22) Filed: Sep. 21, 2006

(65) Prior Publication Data
US 2010/0028197 A1    Feb. 4, 2010

(51) Int. Cl.
*C22C 19/05* (2006.01)

(52) U.S. Cl. .................. 420/445; 420/454; 420/459; 420/460; 148/428

(58) Field of Classification Search ............... 420/8, 420/445, 454, 459, 460
See application file for complete search history.

(56) References Cited

U.S. PATENT DOCUMENTS

| | | | |
|---|---|---|---|
| 2,868,639 A | 1/1959 | Gonser, Jr. et al. | |
| 2,968,550 A | 1/1961 | Eash et al. | |
| 3,166,413 A | 1/1965 | Shaw et al. | |
| 3,293,030 A * | 12/1966 | Child et al. | 420/449 |
| 3,475,165 A | 10/1969 | Cape | |
| 3,494,709 A | 2/1970 | Piearcey | |
| 3,677,331 A * | 7/1972 | Lund et al. | 164/122 |
| 3,810,754 A | 5/1974 | Ford et al. | |
| 3,832,167 A * | 8/1974 | Shaw et al | 420/450 |
| 3,929,467 A * | 12/1975 | Davies et al. | 75/585 |
| 4,019,900 A | 4/1977 | Raghavan et al. | |
| 4,692,305 A | 9/1987 | Rangaswamy et al. | |
| 4,995,922 A | 2/1991 | Jongenburger | |
| 5,298,052 A | 3/1994 | Tanaka et al. | |
| 5,895,516 A | 4/1999 | Tanaka et al. | |
| 6,207,291 B1 | 3/2001 | Ozaki et al. | |
| 6,410,153 B1 | 6/2002 | Broomfield et al. | |
| 6,482,355 B1 | 11/2002 | Santella et al. | |
| 6,968,991 B2 | 11/2005 | Renteria et al. | |
| 7,216,476 B2 * | 5/2007 | Fink | 60/232 |
| 2003/0034098 A1 | 2/2003 | Henry et al. | |
| 2004/0062677 A1 * | 4/2004 | Chabenat et al. | 420/448 |
| 2004/0187973 A1 | 9/2004 | Takahata et al. | |
| 2005/0175465 A1 * | 8/2005 | Nishiyama et al. | 416/244 R |
| 2005/0238526 A1 | 10/2005 | Schall | |
| 2006/0096673 A1 | 5/2006 | Flahaut | |

FOREIGN PATENT DOCUMENTS

| | | |
|---|---|---|
| EP | 0325760 | 12/1988 |
| EP | 0 971 041 B1 | 1/2000 |
| EP | 1154027 | 11/2001 |
| EP | 1154027 A1 * | 11/2001 |

(Continued)

OTHER PUBLICATIONS

EP Search Report (Honeywell).

*Primary Examiner*—George Wyszomierski
*Assistant Examiner*—Tima M McGuthry-Banks
(74) *Attorney, Agent, or Firm*—Alston & Bird

(57) ABSTRACT

The invention provides nickel-based alloys that are useful in the preparation of articles for applications requiring high mechanical and physical properties, such as high strength and high heat stability, while simultaneously reducing the cost of preparation of the alloys. The invention further provides articles, such as turbine wheels, prepared using the inventive alloys.

12 Claims, 1 Drawing Sheet

FOREIGN PATENT DOCUMENTS

| | | | |
|---|---|---|---|
| EP | 1431405 | | 6/2004 |
| JP | 61079742 A | * | 4/1986 |
| JP | 2001-294959 A | | 10/2001 |
| SU | 1719450 A1 | | 3/1992 |
| SU | 1 644 532 A1 | | 12/1994 |
| SU | 1 644 534 A1 | | 12/1994 |

* cited by examiner

NICKEL-BASED ALLOYS AND ARTICLES MADE THEREFROM

FIELD OF THE INVENTION

The invention relates to alloy compositions useful in the preparation of articles for use in applications where high heat resistance is desired. The alloy compositions are particularly nickel-based alloys.

BACKGROUND

Improvements over time in alloying techniques have led to the development of so-called superalloys. The term superalloy is generally used in reference to high performance alloys exhibiting increased mechanical strength and creep resistance at high temperatures. Superalloys also generally exhibit good surface stability, as well as corrosion and oxidation resistance.

Superalloys are generally composed of a base alloying element, such as nickel, cobalt, or nickel-iron, and include a variety of further alloying elements. The development of superalloys has arisen from not only chemical and process innovations, but also from the need for high performance articles formed from such alloys, and such development has been driven particularly by industries (such as the automobile, aerospace, and power industries) that use parts requiring high performance ability. In particular, superalloys have found great use in forming turbine wheels, such as for jet engines.

During operation of jet and land-based turbine engines, high temperatures and stresses are normally encountered. In order to function properly over extended periods of time, the components within these turbine engines must retain high strength and other properties at temperatures in excess of 454° C. (850° F.). Nickel-based superalloys have long been recognized as being useful for preparing parts, such as turbine wheels, having properties at elevated temperatures that are superior to those of steel-based components, and which meet the performance requirements of turbines.

Many nickel-based superalloys are known in the art. One particular example is the alloy MAR 247, which is particularly used in turbine wheels for achieving higher vibration strength. It is a nickel-based alloying including a relatively large amount of cobalt, as well as other high cost elements, such as tantalum and hafnium. The increased cost associated with the preparation of such alloys, however, is highly unfavorable.

Examples of further nickel-based alloys known in the art are disclosed in U.S. Pat. Nos. 6,482,355; 6,410,153; 6,207,291; 5,895,516; 5,298,052; 4,995,922; 4,692,305; 4,019,900; 3,810,754; 3,494,709; 3,166,413; 3,475,165; 2,968,550; and 2,868,639. Despite these various disclosures, there yet remains a need for alloys useful for preparing articles capable of performing at high temperature. Moreover, it is desirable to prepare such alloys while reducing the high cost commonly associated with the components necessary to prepare such alloys.

The need for articles prepared from superalloys continues to increase with time. It is anticipated that exhaust gas temperatures in passenger car engines will continue to increase as the output of such engines continues to increase. Moreover, it is anticipated that applications for gasoline-fueled engines will continue to increase. Accordingly, it is necessary to prepare engine parts, such as turbine wheels, capable of operating at increased temperatures, up to as high as 1050° C. (1922° F.).

One lower-cost alternative as a material for turbine wheels in ordinary passenger cars is INCONEL® 713C. While this material offers reduced cost, it is unable to provide the mechanical properties of higher strength alloys, such as MAR 247. Heretofore, there has not been provided a lower cost alloy composition that still provides the mechanical properties needed in applications, such as described above. The present invention, however, provides such a superalloy.

SUMMARY OF THE INVENTION

The present invention provides alloy compositions useful for preparing articles having high performance properties, particularly high strength and heat resistance. The alloys of the invention are particularly useful in that they can be prepared using lower cost materials than presently known nickel-based superalloys. The inventive alloys disclosed herein are particularly nickel-based alloys that comprise a specific elemental make-up designed to retain the noted preferred properties but with a lowered preparation cost.

The alloys according to the present invention can be used in the preparation of any metallic article, but they are particularly useful in the preparation of material having high performance specifications, especially in relation to strength and heat resistance. One application where the alloys of the invention are especially beneficial is in the preparation of engine parts, such as turbine wheels.

In one aspect, the invention is directed to an alloy composition, preferably a nickel-based composition. In one embodiment, an alloy composition according to the invention comprises about 1% to about 5% by weight cobalt, about 1% to about 5% by weight iron, about 5% to about 7% by weight chromium, about 5.5% to about 6.5% by weight aluminum, about 9.5% to about 11.5% by weight tungsten, and at least about 50% by weight nickel, the above weight percentages being based on the overall weight of the alloy composition.

According to further embodiments, the inventive alloy can comprise one or more further elements. Specifically, an alloy according to the invention, in addition to the above elements, may comprise one or more of the following: about 1.3% to about 2.7% by weight molybdenum; about 1% to about 2% by weight niobium; about 0.05% to about 0.15% by weight carbon; about 0.05% to about 0.2% by weight zirconium; or about 0.01% to about 0.03% by weight boron, based on the overall weight of the composition.

According to yet another embodiment, the alloy composition can comprise one or more further elements present in trace amounts. Such trace elements are preferentially useful for imparting beneficial properties to the alloy composition, but the trace elements may be present in the alloy as non-necessary components or as unavoidable impurities. In certain embodiments, trace elements of the alloy composition are each present in an amount up to about 0.5% by weight, based on the overall weight of the composition. Preferably, when the trace elements are impurities, such impurities are present in an amount of no more than about 0.1% by weight, based on the overall weight of the composition. In one particular embodiment, the trace elements comprise one or more elements selected from the group consisting of copper, lead, manganese, silicon, and sulfur.

In particular embodiments of the invention, only a few specific elements of the alloy composition need be present in specific amounts in order for the alloy composition to be useful in preparing articles having physical properties that are useful as described herein. However, in further embodiments, it is particularly beneficial for the alloy of the invention to comprise a greater number of specific elements in specific amounts. In one particularly useful embodiment, an alloy composition according to the invention comprises the following: 2% to 5% by weight cobalt; 2% to 5% by weight iron; 5% to 7% by weight chromium; 5.5% to 6.5% by weight aluminum; 9.5% to 11.5% by weight tungsten; 1.3% to 2.7% by weight molybdenum; 1% to 2% by weight niobium; 0.05% to 0.15% by weight carbon; 0.05% to 0.2% by weight zirconium; 0.01% to 0.03% by weight boron; and 58% to 71% by weight nickel, based on the overall weight of the composition.

In yet further embodiments of the invention, it is beneficial for the alloy composition of the invention to have a specifically defined composition. For example, in one specific embodiment, an alloy composition according to the invention consists of 2% to 5% by weight cobalt, 2% to 5% by weight iron 5% to 7% by weight chromium, 5.5% to 6.5% by weight aluminum, 9.5% to 11.5% by weight tungsten, 1.3% to 2.7% by weight molybdenum, 1% to 2% by weight niobium, 0.05% to 0.15% by weight carbon, 0.05% to 0.2% by weight zirconium, 0.01% to 0.03% by weight boron, up to 3% by weight trace elements, and the balance nickel, based on the overall weight of the composition.

According to another aspect of the invention, the alloy composition described herein can be used in the preparation of a variety of articles. The alloy composition can be used in the preparation of any article commonly prepared from alloys, particularly superalloys. The alloys of the invention are particularly useful, though, for preparing articles for use in applications where high strength and heat stability are desired. In one specific embodiment, the invention is directed to a turbine wheel formed from an alloy composition as described herein.

As previously noted, high performance articles, such as turbine wheels must be capable of meeting certain specific physical and mechanical requirements. Articles according to the present invention are particularly beneficial in that the articles are capable of meeting strict physical and mechanical requirements. Accordingly, in one embodiment, the invention provides an article having a specific strength when measured according to a specific testing procedure. Preferably, the article prepared using an alloy of the invention has a 2% yield strength of at least about 725 MPa when measured according to ASTM E21. The article further preferably has an ultimate tensile strength of at least about 775 MPa when measure according to ASTM E21. The article still further preferably has an elongation of less than equal to about 5% when measured according to ASTM E21.

BRIEF DESCRIPTION OF THE DRAWINGS

In order to assist the understanding of certain embodiments of the invention, reference will now be made to the appended drawings, which are not necessarily drawn to scale, and wherein.

DETAILED DESCRIPTION OF THE INVENTION

Figure 1:
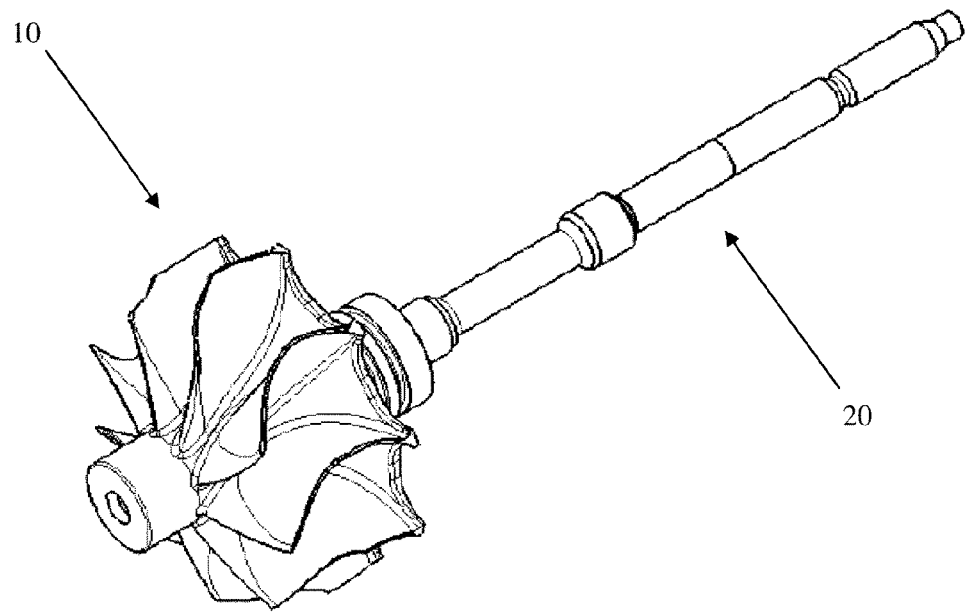
FIG. 1 is a perspective view of a turbine wheel and shaft according to an embodiment of the invention.

The present inventions now will be described more fully hereinafter with reference to specific embodiments of the invention and particularly to the various drawings provided herewith. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present invention is directed to nickel-based alloys, particularly alloys that may be considered superalloys. As such, the alloy compositions comprise nickel as the major alloying element (or alloy component). Generally, as the major alloying element, nickel is present in an amount greater than any other single element present in the alloy. Preferably, nickel is present in an amount greater than the sum of the remaining alloying elements (i.e., comprising greater than 50% by weight of the alloy composition, based on the overall weight of the composition). In a specific embodiment, nickel comprises from about 50% by weight to about 75% by weight of the alloy composition of the invention. In one particular embodiment, nickel comprises about 58% by weight to about 71% by weight of the alloy composition. In still another embodiment, nickel comprises about 60% by weight to about 70% by weight of the alloy composition. Non-limiting examples of nickel content in the present alloy include about 55%, about 57.5%, about 60%, about 62.5%, about 65%, about 67.5%, about 70%, about 72.5%, and about 75% by weight, based on the overall weight of the alloy composition.

According to further embodiments of the invention, the alloy composition may be described in terms of consisting of a group of specific alloying elements in specific amounts. In such embodiments, the amount of nickel present in the alloy can be referred to in terms of nickel forming the balance of the alloy. When described in such terms, it is understood that the balance being nickel indicates that the actual concentration (in weight percent, based on the overall weight of the alloy) of nickel present can be determined by obtaining the sum of the concentration of the other elements present and subtracting that sum from 100, the remainder representing the concentration of nickel present in the alloy (i.e., the balance).

The alloy composition of the invention is particularly characterized in that alloy compositions provided herein can be used in the preparation of articles that meet or exceed mechanical and physical requirements necessary for high stress, high heat applications, yet the elemental makeup of the alloy compositions is such that the alloys can be prepared at a reduced cost in comparison to known, nickel-based superalloys. In certain embodiments, the alloy composition of the invention achieves such characteristics in that the alloy comprises an increased amount of iron. Increased iron concentration in the alloy allows for the use of a wider range of scrap alloys (particularly lower cost iron alloys) in preparing the inventive alloy. Allowing for the use of a greater array of scrap alloys is particularly beneficial for reducing the cost of the alloy.

Increased iron composition can generally be achieved without adversely affecting physical properties of the alloy. For example, increased iron concentration up to about 3.5% by weight, based on the overall weight of the alloy composition, has little to no effect on stress rupture of the alloy, although increases beyond about 3.5% can lead to a decrease in stress rupture. Accordingly, in certain embodiments, it is beneficial to make further changes to the alloy composition to compensate for any undesirable effects arising from the presence of increased iron or impurities associated with the iron source.

In particular embodiments, the alloy composition comprises iron in an amount of about 1% to about 5% by weight, based on the overall weight of the alloy composition. In further embodiments, the alloy composition comprises iron in an amount of about 1.5% to about 5%, about 2% to about 5% by weight, 2% to about 4% by weight, or about 2% to about 3% by weight. While the increase in the amount of iron present in the nickel-based alloy does not generally affect mechanical properties of the alloy, such increases may lead to a reduction in the overall strength of the alloy composition, particularly if the scrap material used as the iron source provides an appreciable amount of impurities. Such a reduction in strength is generally only slight compared to the overall strength of the alloy composition. Moreover, any reduction in strength arising from the increased iron concentration in the alloy is countered, according to the invention, through manipulation of the concentration of the remaining alloy elements, or through addition of further alloying elements.

In one embodiment, the reduction in strength arising from the increased iron concentration is overcome through the use of cobalt. Cobalt is effective for increasing the overall strength of the alloy composition; however, the incorporation of relatively large amounts of cobalt is generally avoided in the art due to the increased cost associated with the use of cobalt. This is overcome, though, in the present invention, by the corresponding increase in iron concentration, as described above, which reduces cost. Increasing cobalt concentration has a positive effect on stress rupture and can particularly offset any decreases in stress rupture arising from an increased iron content. However, alloys with lower cobalt concentration may exhibit better yield strength. Moreover, lowered cobalt concentration can also lower elongation values for the alloy.

The advantages of the inventive alloy, particularly in relation to maintaining the overall strength associated with the alloy while reducing the overall cost of the alloy, can be achieved, in certain embodiments, by using specified amounts of both iron and cobalt. In particular embodiments, the alloy composition comprises cobalt in an amount of about 1% to about 5% by weight, based on the overall weight of the alloy composition. In further embodiments, the alloy composition comprises cobalt in an amount of about 1.5% to about 5% by weight, about 2% to about 5% by weight, about 2.5% to about 5% by weight, or about 3% to about 4% by weight.

In addition to nickel, iron, and cobalt, the alloy compositions of the invention may contain one or more further alloying elements as useful for imparting beneficial properties to the alloy composition. Elements useful in certain preferred embodiments are described herein. Nevertheless, the inclusion of certain elements and the exclusion of certain further elements are not intended to limit the scope of the invention. Rather, the further elements described herein are only preferred, and further elements, as deemed beneficial, could be incorporated in the alloy without departing from the present invention. The amounts in which the further elements are included are based on the weight of the overall composition.

In one embodiment, the alloy composition may further comprise chromium, which can be particularly useful for improving corrosion resistance in the alloy composition. Preferably, when chromium is included, it is present in an amount of about 5% to about 7% by weight. According to another embodiment, chromium is present in an amount of about 5.5% to about 6.5% by weight.

In another embodiment, the alloy composition may further comprise aluminum, which can also be useful for improving corrosion resistance, particularly at high temperatures. Adjusting the aluminum content can be useful for adjusting the properties of the alloy to have increased strength (increasing the aluminum content) or have greater ductility (reducing the aluminum content). Preferably, when aluminum is included in the alloy, it is present in an amount of about 5.5% to about 6.5% by weight. According to another embodiment, aluminum is present in an amount of about 5.5% to about 6% by weight.

In yet another embodiment, the alloy composition of the invention may further comprise tungsten. It can be particularly useful to include tungsten for increasing the overall strength of the alloy. Preferably, when tungsten is included in the alloy, it is present in an amount of about 9.5% to about 11.5% by weight. According to another embodiment, tungsten is present in an amount of about 9.5% to about 10.5% by weight.

In still a further embodiment, the alloy composition can further comprise molybdenum, which can also contribute to strength. When molybdenum is present, preferentially it is included in an amount of about 1.3% to about 2.7% by weight. According to another embodiment, molybdenum is present in an amount of about 1.5% to about 2.2% by weight.

The alloy composition, according to a further embodiment, can comprise niobium for increasing strength. As with aluminum, adjustments to the niobium content of the alloy can be made to either increase strength or ductility of the alloy. Preferably, when niobium is included, it is present in an amount of about 1% to about 2% by weight. According to another embodiment, niobium is present in an amount of about 1.2% to about 1.8% by weight.

According to still a further embodiment, the alloy composition of the invention can comprise zirconium, which may particularly combine with carbon to strengthen the alloy. Preferably, when zirconium is present, it is included in an amount of about 0.05% to about 0.2% by weight. According to another embodiment, zirconium is present in an amount of about 0.08% to about 0.18% by weight.

In yet another embodiment, the alloy composition of the invention can further comprise carbon. Particularly, carbon can be useful for strengthening grain boundaries through formation of carbides. When carbon is present, it is preferable for it to be included in an amount of about 0.05% to about 0.15% by weight. According to another embodiment, carbon is present in an amount of about 0.1% to about 0.15% by weight.

In another embodiment, the alloy composition may further comprise boron, which can be particularly useful for improving creep strength. When boron is present in the alloy, it is preferably present in an amount of about 0.01% to about 0.03% by weight. According to another embodiment, boron is present in an amount of about 0.01% to about 0.02% by weight.

In addition to the above elements, the alloy of the invention may further comprise elements present in trace amounts, and such elements may be referred to as trace elements. The term "trace element" as used herein means any element present in the alloy composition of the invention for which no minimum content is required. Trace elements, therefore, can be completely absent from the alloy composition. Alternatively, trace elements may be present in the alloy as a direct result of the process used in preparing the alloy, or trace elements may be intentionally included in the alloy composition, albeit in small amounts.

If a trace element is included in the alloy composition, it is preferably present at less than or equal to a maximum amount. In one embodiment, an individual trace element can be present in an amount up to about 0.6% by weight. More preferably, a trace element is present in an amount up to about 0.5% by weight. Trace elements preferably only comprise a minor percentage of the total alloy composition of the present invention. In certain embodiments, the sum of all trace elements present can comprise up to about 5% of the total weight of the overall alloy composition of the invention. Preferably, the sum of all trace elements comprises up to about 4% by weight. More preferably, the sum of all trace elements comprises up to about 3% by weight of the overall alloy composition. In one specific embodiment, the sum of all trace elements comprises up to about 2% by weight of the overall alloy composition.

In certain embodiments, trace elements can be impurities. As common to alloying processes, particularly where lower cost materials are used in preparing the alloy, it is common for various impurities to be introduced into the alloy composition. Accordingly, any element present in the alloy composition that is not necessarily desired as an alloying element may be considered an impurity. Moreover, non-metallic materials, such as phosphorus, nitrogen, and oxygen, may be present as impurities. Of course, other non-metallic materials could also be included as impurities.

Elements that may particularly be present in trace amounts in the alloy composition of the present invention include, but are not limited to, copper, lead, manganese, silicon, and sulfur. Preferably, copper, manganese, and silicon are each separately present in an amount up to about 0.5% by weight. Similarly, sulfur is preferably present in an amount up to about 0.015% by weight. Lead is preferably present only in an amount up to about 25 ppm (about 0.0025% by weight).

The alloy compositions of the present invention are suitable for use in preparing a variety of articles by any methods generally known in the art. Moreover, the alloys themselves may be prepared using any of the various traditional methods of metal production and forming. Traditional casting, powder metallurgical processing, directional solidification, and single-crystal solidification are non-limiting examples of methods suitable for forming ingots of these alloys. Thermal and thermo-mechanical processing techniques common in the art for the formation of other alloys are suitable for use in manufacturing and strengthening the alloys of the present invention. Exemplary methods of preparing alloys and preparing articles made therefrom are provided in the following U.S. patents, which are incorporated herein by reference in their entirety: U.S. Pat. No. 5,534,085; U.S. Pat. No. 5,154,884; U.S. Pat. No. 4,888,694; U.S. Pat. No. 4,816,084; U.S. Pat. No. 4,769,087; U.S. Pat. No. 4,676,846; U.S. Pat. No. 4,608,094; U.S. Pat. No. 4,532,974; U.S. Pat. No. 4,514,360; and U.S. Pat. No. 4,191,094.

In one particular embodiment, an alloy composition according to the present invention can be used in a vacuum investment casting technique to prepare articles, such as turbine wheels. Investment casting (also known as the lost wax process) is commonly used in the art and is useful for preparing articles having intricate shapes while maintaining high accuracy. Metals that are hard to machine or fabricate are particularly good candidates for this process, which can be used to make parts that cannot be produced by normal manufacturing techniques, such as turbine blades that have complex shapes, or airplane parts that have to withstand high temperatures.

Generally, investment casting comprising the following steps: forming a wax replica of the part to be cast; building a shell around the wax replica; dewaxing to leave the shell; filling the shell, such as by conventional casting, with the molten metal; and removing the shell around the cast part. Of course, such a method could be altered to optimize the casting technique.

In one specific example, the mold is made by making a pattern using wax or some other material that can be melted away. The wax pattern is dipped in a mixture (such as plaster of Paris slurry with further components, such as a binder and a refractory), which coats the wax pattern and forms a skin. This is dried and the process of dipping in the slurry and drying is repeated until a desired thickness is achieved. The pattern is heated (such as in an oven) to melt the wax out of the pattern and leave a mold that can be filled with the molten metal. The wax pattern itself can be made by duplicating using a stereo lithography or similar model, which has been fabricated using a computer solid model master.

Just before pouring the molten metal, the mold can be pre-heated to about 1000° C. (1832° F.) to remove any residues of wax and harden the binder. The pour in the pre-heated mold also ensures that the mold will fill completely. Pouring can be done using gravity, pressure or vacuum conditions.

As previously pointed out, the alloys of the present invention are particularly useful in the preparation of articles for use in applications requiring high mechanical performance, such as high strength and high heat resistance. In one particular embodiment according to the invention, there is provided a turbine wheel comprising an alloy as described herein.

Figure 2:
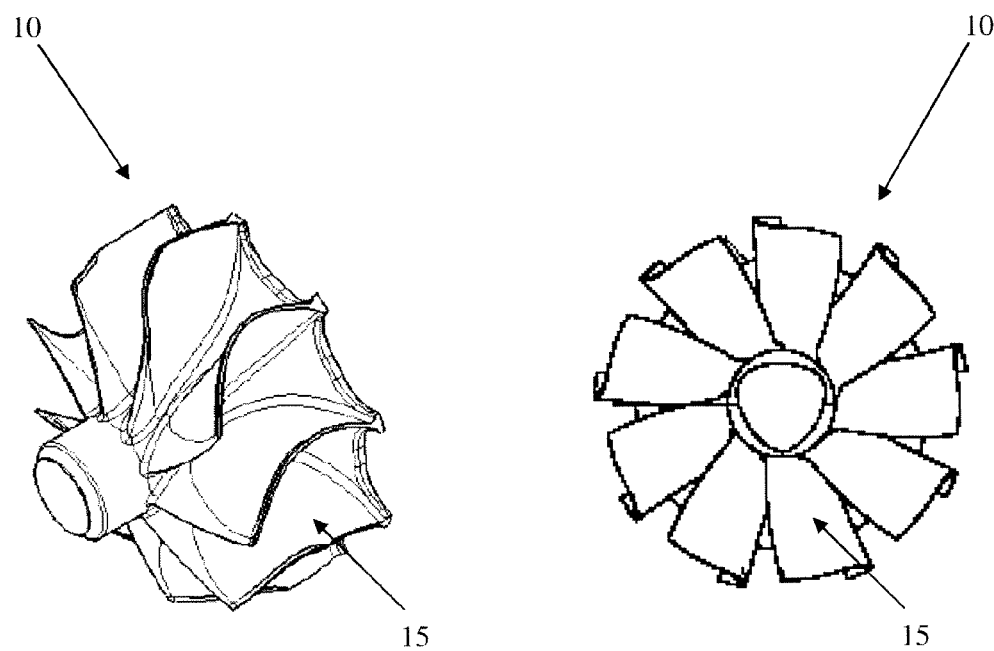
FIG. 2 is a perspective view of a turbine wheel according to an embodiment of the invention.
Figure 3:
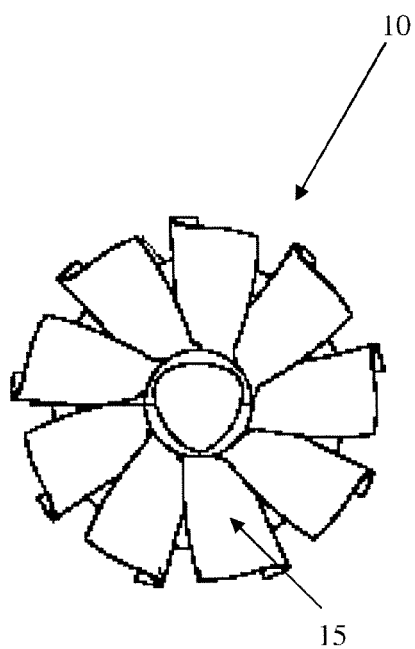
FIG. 3 is a front view of a turbine wheel according to an embodiment of the invention.

One embodiment of a turbine wheel that may be prepared using the inventive alloy is illustrated in FIG. 1-FIG. 3. In particular, FIG. 1 illustrates a turbine wheel 10 attached to a shaft 20. As further shown in FIG. 2 and FIG. 3, the turbine wheel 10 comprises a plurality of blades 15. Such turbine wheels find particular use in various types of engines, and more particularly in gasoline fueled engines. Part or all of such turbine wheels can be prepared using the alloy composition of the present invention. Moreover, the shaft, as well as further components of an engine, can be prepared completely, or in part, using the inventive alloy composition. In one embodiment, a turbine wheel is cast as a single part using an alloy composition according to the present invention.

Articles, such as the turbine wheel illustrated in FIG. 1-FIG. 3, prepared using certain embodiments of the inventive alloy composition described herein would particularly be expected to meet or exceed increased performance requirement for use in high temperature applications. As illustrated in the Examples, certain embodiments of the alloy composition of the invention provide for the preparation of articles having mechanical properties (such as ultimate tensile strength, yield strength, and elongation), that exemplify excellent performance at increased temperatures. Accordingly, articles prepared using certain embodiments of the alloy composition of the invention would be expected to find beneficial use in high temperature applications and provide not only increased performance but also prolonged life of the article under the high temperature conditions.

In one embodiment, articles prepared using the alloy of the present invention are particularly capable of meeting or exceeding various standards for specific physical or mechanical properties. For example, in one embodiment, an article prepared using the alloy of the invention has a specific yield strength, such as when evaluated according to testing method ASTM E21 (Rev. 1992). According to ASTM E21, metallic materials can be evaluated for determination of tensile strength, yield strength, elongation, and reduction of area at elevated temperatures.

For purposes of the present invention, tensile properties are obtained from flat specimens machined transversely from the back face of a casting and tested in conformance with ASTM E21. In one preferred embodiment, articles prepared using the inventive alloy exhibit a 0.2% yield strength, when evaluated according to ASTM E21 at a temperature of about 760° C. (1400° F.), of at least about 700 MPa. According to further embodiments, such articles have a yield strength of at least about 725 MPa, at least about 750 MPa, at least about 775 MPa, or at least about 790 MPa. In one specific embodiment, articles prepared using the alloy of the present invention, when tested according to ASTM E21, have a 0.2% yield strength of at least about 738 MPa.

According to another embodiment, articles prepared using the alloy of the present invention, when tested according to ASTM E21, have an ultimate tensile strength at a temperature of about 760° C. (1400° F.) of at least about 725 MPa. According to further embodiments, such articles have an ultimate tensile strength of at least about 750 MPa, at least about 775 MPa, at least about 800 MPa, at least about 825 MPa, or at least about 850 MPa. In one specific embodiment, articles prepared using the alloy of the present invention, when tested according to ASTM E21, have an ultimate tensile strength of at least about 786 MPa.

According to another embodiment, articles prepared using the inventive alloy exhibit an elongation of less than or equal to about 6% at a temperature of about 760° C. (1400° F.). According to further embodiments, elongation is less than or equal to about 5% or less than or equal to about 4%. Such an elongation can be measured using a flat specimen held at a temperature of about 870° C. (1,598° F.), +/−5.5° C. (10° F.), for a period of 24 hours while an axial load of 414 MPa (60,000 lbs/in$^2$) is applied continuously.

Elongation may further be evaluated by the creep/stress rupture test, as provided in ASTM E139 (Rev. 1996). Again, when tested according to such standards, articles prepared using an alloy according to the invention preferably exhibit an elongation of less than or equal to about 6%, preferably less than or equal to about 5% or less than equal to about 4%.

According to yet another embodiment of the invention, articles prepared using the alloy can be evaluated using oxidation testing. In one specific test procedure, specimens are prepared by cutting an ingot alloy to a size of 10 mm×5 mm×1 mm and polishing the surfaces mechanically using emery papers down to 600 grit. Samples so prepared are weighed, the weight being recorded to 3 decimal places. In the cyclic oxidation test, the specimen is placed in a furnace at a temperature of 1050° C. (1922° F.) for 20 followed by air cooling to room temperature. Such a thermal cycle is repeated 10 times so that total exposure time to heated conditions is 200 hours. The samples then weighed to determine weight gain due to oxidation. Oxidation testing, as provided above, is particularly useful in comparative testing to determine the usefulness of a specific alloy in relation to a known alloy composition.

EXAMPLES

The present invention is more fully illustrated by the following examples, which are set forth to illustrate the present invention and are not to be construed as limiting.

Table 1 below provides the composition of two alloys prepared according to the present invention. Tables 2-4 provide data relating to the mechanical properties of the alloys under test conditions. Table 2 provides testing data related to the 0.2% yield strength of the alloys when tested according to ASTM E21. Table 3 provides testing data related to ultimate tensile strength of the alloys when tested according to ASTM E21. Table 4 provides testing date related to elongation when tested according to ASTM E21.

TABLE 1

Alloy Formulation

| Element | Example 1 Wt. % | Example 2 Wt. % |
| --- | --- | --- |
| C | 0.12 | 0.12 |
| Si | 0.32 | <0.05 |
| Mn | <0.05 | <0.05 |
| P | <0.005 | <0.005 |
| S | 0.002 | 0.003 |
| Al | 5.94 | 5.90 |
| B | 0.0177 | 0.0187 |
| Co | 2.53 | 2.56 |
| Cr | 6.47 | 6.51 |
| Cu | <0.05 | <0.05 |
| Fe | 2.00 | 2.07 |
| Mo | 2.00 | 1.96 |
| N | <0.001 | <0.001 |
| Nb | 1.43 | 1.42 |
| O | 0.009 | 0.0012 |
| Ti | <0.1 | <0.1 |
| W | 10.17 | 9.98 |
| Zr | 0.18 | 0.08 |

TABLE 2

0.2% Yield Strength (MPa)

| Temp. (° C.) | Example 1 | Example 2 |
| --- | --- | --- |
| 600 | 783 | 813 |
| 760 | 752 | 795 |
| 870 | 739 | 742 |
| 950 | 552 | 555 |
| 1000 | 438 | 440 |
| 1050 | 324 | 326 |

TABLE 3

Ultimate Tensile Strength (MPa)

| Temp. (° C.) | Example 1 | Example 2 |
| --- | --- | --- |
| 600 | 818 | 812 |
| 760 | 786 | 854 |
| 870 | 798 | 742 |
| 950 | 600 | 589 |
| 1000 | 470 | 466 |
| 1050 | 354 | 345 |

TABLE 4

Elongation (%)

| Temp. (° C.) | Example 1 | Example 2 |
| --- | --- | --- |
| 600 | 5 | 4 |
| 760 | 5 | 5 |
| 870 | 4 | 4 |
| 950 | 5 | 8 |
| 1000 | 8 | 4 |
| 1050 | 10 | 6 |

As seen from the above tables, the compositions of the invention provide excellent mechanical properties under the test conditions according to ASTM E21. In particular, at a test temperature of 760° C. (1400° F.), the inventive alloys of Examples 1 and 2 exhibit a 0.2% yield strength of 752 MPa and 795 MPa, an ultimate tensile strength of 786 MPa and 854 MPa, and an elongation of 5%. Accordingly, the inventive alloys exhibit properties that meet or exceed the properties of alloys presently used in the industry, such as MAR 247. The alloys of the present invention, however, continue to exhibit excellent properties at even higher temperatures. For example, as seen in Table 3, an alloy of the present invention can maintain an ultimate tensile strength in the range of 800 MPa at a temperature of 870° C. (1598° F.). Moreover, the inventive alloys continue to show good strength properties at even higher temperatures in the range of 1050° C. (1922° F.).

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An alloy composition consisting of:
   about 1% to about 5% by weight cobalt;
   about 1% to about 5% by weight iron;
   about 5% to about 7% by weight chromium;
   about 5.5% to about 6.5% by weight aluminum;
   about 9.5% to about 11.5% by weight tungsten;
   about 1.3% to about 2.7% by weight molybdenum;
   about 1% to about 2% by weight niobium;
   about 0.05% to about 0.15% by weight carbon;
   about 0.05% to about 0.2% by weight zirconium;
   about 0.01% to about 0.03% by weight boron; and
   the balance nickel and unavoidable impurities, based on the overall weight of the composition.

2. The alloy composition of claim 1, wherein the unavoidable impurities are selected from the group consisting of copper, lead, manganese, silicon, sulfur, phosphorus, nitrogen, oxygen, and combinations thereof.

3. The alloy composition of claim 1, wherein said unavoidable impurities include one or more of the following:
   up to about 0.5% by weight copper;
   up to about 0.5% by weight manganese;
   up to about 0.5% by weight silicon;
   up to about 0.015% by weight sulfur; and
   up to about 0.0025% by weight lead, based on the overall weight of the composition.

4. The alloy composition of claim 1, wherein said unavoidable impurities are present in a total amount up to about 3% by weight, based on the overall weight of the composition.

5. The alloy composition of claim 1, wherein said unavoidable impurities are present in a total amount up to about 2% by weight, based on the overall weight of the composition.

6. The alloy composition of claim 1, wherein the cobalt is present in an amount of about 2% to about 5% by weight.

7. The alloy composition of claim 1, wherein the iron is present in an amount of about 2% to about 5% by weight.

8. A turbine wheel comprising an alloy composition according to claim 1.

9. The turbine wheel of claim 8, wherein said turbine wheel has an ultimate tensile strength at 760° C. of at least about 775 MPa when measured according to ASTM E21 (1992).

10. The turbine wheel of claim 8, wherein said turbine wheel has a 0.2% yield strength at 760° C. of at least about 725 MPa when measured according to ASTM E21 (1992).

11. The turbine wheel of claim 8, wherein said turbine wheel exhibits a percent elongation of no more than about 5% when subjected for a time of 24 hours to a continuous axial load of 414 MPa while at a temperature of about 870° C.

12. The alloy composition of claim 6, wherein the iron is present in an amount of about 2% to about 5% by weight.

* * * * *